United States Patent
Loftus et al.

(10) Patent No.: US 10,516,189 B2
(45) Date of Patent: Dec. 24, 2019

(54) HIGH VOLTAGE BUS CONTACTOR FAULT DETECTION

(71) Applicant: FORD GLOBAL TECHNOLOGIES, LLC, Dearborn, MI (US)

(72) Inventors: Michael Edward Loftus, Northville, MI (US); Benjamin A. Tabatowski-Bush, South Lyon, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 131 days.

(21) Appl. No.: 15/352,299

(22) Filed: Nov. 15, 2016

(65) Prior Publication Data

US 2018/0134169 A1 May 17, 2018

(51) Int. Cl.
| | |
|---|---|
| *H02J 7/00* | (2006.01) |
| *H01M 10/42* | (2006.01) |
| *H01M 10/44* | (2006.01) |
| *H01M 10/48* | (2006.01) |
| *B60L 58/12* | (2019.01) |
| *B60L 58/10* | (2019.01) |

(52) U.S. Cl.
CPC .......... *H01M 10/425* (2013.01); *B60L 58/10* (2019.02); *B60L 58/12* (2019.02); *H01M 10/44* (2013.01); *H01M 10/48* (2013.01); *H02J 7/0063* (2013.01); *B60L 2240/54* (2013.01); *B60L 2240/545* (2013.01); *B60L 2240/547* (2013.01); *B60L 2240/549* (2013.01); *H01M 2010/4271* (2013.01); *H01M 2220/20* (2013.01); *H02J 2007/0067* (2013.01); *Y02T 10/7005* (2013.01); *Y02T 10/705* (2013.01); *Y02T 10/7044* (2013.01)

(58) Field of Classification Search
CPC . B60L 11/1853; B60L 11/1859; H01M 10/44; H01M 10/425; H02J 7/0063
USPC .......................................................... 320/136
See application file for complete search history.

(56) References Cited

U.S. PATENT DOCUMENTS 5,369,540 A * 11/1994 Konrad ............... B60L 11/1803
361/3
5,418,401 A * 5/1995 Kaneyuki ............. H02J 7/1423
307/10.1

(Continued)

FOREIGN PATENT DOCUMENTS

| DE | 102012201827 A1 * | 8/2013 | ............... H02H 5/12 |
| FR | 2986671 A1 * | 8/2013 | ............... H02H 5/12 |

(Continued)

OTHER PUBLICATIONS

"McGraw-Hill Dictionary of Electrical & Computer Engineering," McGraw-Hill Companies Inc., published 2004, ISBN 0071442103, pp. 66 and 633.*

*Primary Examiner* — Robert Grant
*Assistant Examiner* — John T Trischler
(74) *Attorney, Agent, or Firm* — David Kelley; Brooks Kushman P.C.

(57) ABSTRACT

A system for a vehicle includes a pair of electrical buses connected to terminals of a traction battery via a shared positive contactor and a pair of negative contactors. The system further includes a controller configured to, responsive to a request to close the contactors and a difference between voltage magnitudes of the buses being greater than a predefined threshold, actively discharge one of the buses to reduce the difference.

16 Claims, 4 Drawing Sheets

(56) References Cited

U.S. PATENT DOCUMENTS

| | | | | |
|---|---|---|---|---|
| 5,488,283 A * | 1/1996 | Dougherty | H01M 10/0413 | 307/10.1 |
| 5,818,201 A * | 10/1998 | Stockstad | H02J 7/0016 | 320/119 |
| 6,002,221 A * | 12/1999 | Ochiai | B60L 3/0023 | 318/139 |
| 6,213,571 B1 * | 4/2001 | Yamada | B60L 7/006 | 188/158 |
| 6,320,351 B1 * | 11/2001 | Ng | H02J 7/0032 | 320/104 |
| 6,856,137 B2 * | 2/2005 | Roden | B60L 3/0061 | 324/509 |
| 7,438,984 B2 * | 10/2008 | Aoyagi | B60H 1/00392 | 429/430 |
| 7,489,048 B2 * | 2/2009 | King | B60L 11/1864 | 307/10.1 |
| 7,571,683 B2 * | 8/2009 | Kumar | B60L 9/16 | 105/35 |
| 7,608,940 B2 * | 10/2009 | Osawa | H02J 7/0029 | 307/10.7 |
| 7,692,404 B2 * | 4/2010 | Harris | B60L 7/14 | 320/117 |
| 7,780,562 B2 * | 8/2010 | King | B60K 6/26 | 475/5 |
| 7,782,018 B2 * | 8/2010 | Voigt | G03B 15/05 | 320/135 |
| 7,854,203 B2 * | 12/2010 | Kumar | B60L 9/16 | 105/35 |
| 7,866,425 B2 * | 1/2011 | King | B60L 7/06 | 180/65.31 |
| 7,940,016 B2 * | 5/2011 | Donnelly | B60L 7/04 | 318/139 |
| 8,063,506 B2 * | 11/2011 | Sakata | H02H 9/001 | 307/10.1 |
| 8,085,515 B2 * | 12/2011 | Yugou | H01H 47/002 | 361/23 |
| 8,115,457 B2 * | 2/2012 | Balakrishnan | H02M 1/32 | 320/166 |
| 8,129,951 B2 * | 3/2012 | Turner | B60L 50/66 | 320/134 |
| 8,274,173 B2 * | 9/2012 | King | B60L 1/003 | 307/9.1 |
| RE43,956 E * | 2/2013 | King | B60L 11/1864 | 307/10.1 |
| 8,373,381 B2 * | 2/2013 | Raiser | H01M 10/44 | 320/101 |
| 8,436,590 B2 * | 5/2013 | Funaba | B60K 6/445 | 307/109 |
| 8,513,953 B2 * | 8/2013 | Myoen | H02H 9/001 | 180/443 |
| 8,560,254 B2 * | 10/2013 | Newhouse | B60R 16/023 | 324/537 |
| 8,564,156 B2 * | 10/2013 | Kang | B60L 11/1805 | 307/115 |
| 8,575,940 B2 * | 11/2013 | Yugou | B60L 3/04 | 307/10.1 |
| 8,583,389 B2 * | 11/2013 | Aoshima | B60L 3/0046 | 702/63 |
| 8,624,562 B2 * | 1/2014 | Balakrishnan | H02M 1/32 | 320/166 |
| 8,643,500 B2 * | 2/2014 | Lee | B60L 11/1866 | 320/112 |
| 8,674,657 B2 * | 3/2014 | Kaino | H02J 7/0029 | 320/116 |
| 8,686,694 B2 * | 4/2014 | Funaba | B60K 6/445 | 307/109 |
| 8,823,323 B2 * | 9/2014 | Troxel | H01M 10/4207 | 320/118 |
| 8,884,585 B2 * | 11/2014 | Troxel | H01M 10/4207 | 320/118 |
| 8,896,160 B2 * | 11/2014 | Kang | B60L 11/1805 | 307/115 |
| RE45,431 E * | 3/2015 | King | B60L 11/1864 | 307/10.1 |
| 8,994,327 B2 | 3/2015 | Kusch et al. | | |
| 9,007,066 B2 | 4/2015 | Sufrin-Disler et al. | | |
| 9,045,052 B2 * | 6/2015 | Girard | B60L 11/1853 | |
| 9,061,595 B2 * | 6/2015 | King | B60L 1/003 | |
| 9,065,280 B2 * | 6/2015 | Workman | H02J 7/0013 | |
| 9,065,340 B2 * | 6/2015 | Balakrishnan | H02M 1/32 | |
| 9,112,247 B2 * | 8/2015 | Yamauchi | H01M 10/425 | |
| 9,142,372 B2 * | 9/2015 | Kusch | H01H 47/001 | |
| 9,166,419 B2 * | 10/2015 | Girard | H01M 10/441 | |
| 9,187,000 B2 * | 11/2015 | Kuwano | B60L 11/1803 | |
| 9,217,765 B2 * | 12/2015 | Lazar, II | B60L 3/04 | |
| 9,233,612 B2 * | 1/2016 | Kumar | B60L 9/16 | |
| 9,252,418 B2 * | 2/2016 | Achhammer | H01M 10/488 | |
| 9,260,015 B2 * | 2/2016 | Gonzales | G07C 5/0808 | |
| 9,340,122 B2 * | 5/2016 | Yamauchi | B60L 11/1866 | |
| 9,401,597 B2 * | 7/2016 | Werner | H02H 5/12 | |
| 9,487,096 B2 * | 11/2016 | Dougan | H02J 7/00 | |
| 9,525,291 B1 * | 12/2016 | Huynh | H02J 7/0031 | |
| 9,527,401 B2 * | 12/2016 | Le | H01M 10/441 | |
| 9,537,299 B2 * | 1/2017 | Rozman | H02J 1/10 | |
| 9,537,326 B2 * | 1/2017 | Troxel | H01M 10/4207 | |
| 9,568,555 B2 * | 2/2017 | Nortman | H02J 7/0016 | |
| 9,588,181 B2 * | 3/2017 | Nortman | H02J 7/0016 | |
| 9,627,896 B2 * | 4/2017 | Nishihara | G01R 31/3658 | |
| 9,630,520 B2 * | 4/2017 | Tabatowski-Bush | B60L 58/12 | |
| 9,718,375 B2 * | 8/2017 | Le | B60L 50/64 | |
| 9,735,665 B2 * | 8/2017 | Balakrishnan | H02M 1/32 | |
| 9,783,037 B2 * | 10/2017 | Muto | B60L 7/14 | |
| 9,783,078 B2 * | 10/2017 | Huynh | B60L 3/0092 | |
| 9,845,783 B2 * | 12/2017 | Steele | F02N 11/0866 | |
| 9,931,949 B2 * | 4/2018 | Loftus | B60L 11/1809 | |
| 9,969,292 B2 * | 5/2018 | Thieme | B60L 11/1861 | |
| 9,977,083 B2 * | 5/2018 | Wand | G01R 31/34 | |
| 9,981,567 B2 * | 5/2018 | Kawano | B60L 11/1872 | |
| 10,076,964 B2 * | 9/2018 | Hong | H02J 7/0021 | |
| 10,230,246 B2 * | 3/2019 | Troxel | H01M 10/4207 | |
| 2005/0235865 A1 | 10/2005 | Kumar | B60L 9/16 | 105/61 |
| 2006/0012336 A1 * | 1/2006 | Fujita | H02J 7/0021 | 320/119 |
| 2006/0076934 A1 * | 4/2006 | Ogata | H02J 7/0031 | 320/136 |
| 2006/0087775 A1 * | 4/2006 | Osawa | H02H 3/027 | 361/23 |
| 2006/0091857 A1 * | 5/2006 | Nakanishi | H02J 7/0021 | 320/116 |
| 2006/0222910 A1 * | 10/2006 | Aoyagi | B60H 1/00392 | 429/432 |
| 2006/0238033 A1 * | 10/2006 | Raiser | H01M 10/44 | 307/66 |
| 2007/0139005 A1 * | 6/2007 | Osawa | H02J 7/0029 | 320/115 |
| 2007/0159007 A1 * | 7/2007 | King | B60L 11/1864 | 307/71 |
| 2007/0221627 A1 * | 9/2007 | Yugou | H01H 47/002 | 218/136 |
| 2009/0160249 A1 * | 6/2009 | Soma | B60L 11/005 | 307/9.1 |
| 2009/0167242 A1 * | 7/2009 | Naganuma | H01M 10/441 | 320/118 |
| 2009/0167248 A1 * | 7/2009 | Murao | H02J 7/0016 | 320/134 |
| 2009/0295401 A1 * | 12/2009 | Kamata | G01R 31/006 | 324/509 |
| 2009/0309545 A1 * | 12/2009 | Kunimitsu | G01R 31/3658 | 320/118 |
| 2009/0314179 A1 * | 12/2009 | Kumar | B60L 9/16 | 105/35 |
| 2010/0019724 A1 * | 1/2010 | Mizutani | H01M 10/425 | 320/118 |
| 2010/0026235 A1 * | 2/2010 | Harris | A61K 9/0075 | 320/101 |
| 2010/0085009 A1 * | 4/2010 | Kang | H02J 7/0016 | 320/118 |

(56) References Cited

U.S. PATENT DOCUMENTS

| | | | |
|---|---|---|---|
| 2010/0133912 A1* | 6/2010 | King | B60L 1/003 307/82 |
| 2010/0133914 A1* | 6/2010 | Kang | B60L 11/1805 307/98 |
| 2010/0250194 A1* | 9/2010 | Newhouse | B60R 16/023 702/183 |
| 2011/0025278 A1* | 2/2011 | Balakrishnan | H02M 1/32 320/166 |
| 2011/0031939 A1* | 2/2011 | Funaba | B60K 6/445 320/166 |
| 2011/0041723 A1* | 2/2011 | Kumar | B60L 9/16 105/35 |
| 2011/0080139 A1* | 4/2011 | Troxel | H01M 10/4207 320/134 |
| 2011/0084663 A1* | 4/2011 | Troxel | H01M 10/4207 320/118 |
| 2011/0095725 A1* | 4/2011 | Troxel | H01M 10/4207 320/118 |
| 2011/0204850 A1* | 8/2011 | Kaino | H02J 7/0029 320/116 |
| 2011/0210746 A1* | 9/2011 | Yugou | B60L 3/04 324/427 |
| 2011/0285539 A1* | 11/2011 | Lee | B60L 11/1866 340/636.1 |
| 2012/0013297 A1* | 1/2012 | Turner | B60L 50/66 320/109 |
| 2012/0083948 A1* | 4/2012 | Tate, Jr. | B60L 58/12 701/22 |
| 2012/0105018 A1* | 5/2012 | Balakrishnan | H02M 1/32 320/166 |
| 2012/0139495 A1* | 6/2012 | Nortman | H02J 7/0016 320/128 |
| 2012/0139549 A1* | 6/2012 | Sufrin-Disler | H02J 7/0016 324/433 |
| 2012/0139553 A1* | 6/2012 | Nortman | H02J 7/0016 324/537 |
| 2012/0223677 A1* | 9/2012 | Yamauchi | H01M 10/425 320/116 |
| 2012/0299378 A1* | 11/2012 | King | B60L 1/003 307/18 |
| 2012/0326671 A1* | 12/2012 | Krause | H01M 10/44 320/126 |
| 2013/0049684 A1* | 2/2013 | Kusch | B60L 11/1812 320/109 |
| 2013/0057219 A1* | 3/2013 | Sakata | B60L 11/1866 320/118 |
| 2013/0106178 A1* | 5/2013 | Girard | B60L 11/1853 307/9.1 |
| 2013/0106357 A1* | 5/2013 | Girard | H01M 10/441 320/126 |
| 2013/0119941 A1* | 5/2013 | Moorhead | G01R 31/3648 320/136 |
| 2013/0214745 A1* | 8/2013 | Funaba | B60K 6/445 320/166 |
| 2013/0307351 A1* | 11/2013 | Kusch | H01H 47/001 307/125 |
| 2013/0337294 A1* | 12/2013 | Achhammer | B60L 58/21 429/50 |
| 2014/0021800 A1* | 1/2014 | Kang | B60L 11/1805 307/115 |
| 2014/0028094 A1 | 1/2014 | Rozman et al. | |
| 2014/0046534 A1* | 2/2014 | Lazar, II | B60L 3/04 701/33.9 |
| 2014/0077731 A1* | 3/2014 | Kuwano | B60L 11/1809 318/139 |
| 2014/0097803 A1* | 4/2014 | Balakrishnan | H02M 1/32 320/166 |
| 2014/0152261 A1* | 6/2014 | Yamauchi | B60L 11/1866 320/118 |
| 2014/0312685 A1* | 10/2014 | Moga | B60L 3/0023 307/9.1 |
| 2015/0115966 A1* | 4/2015 | Berman | B60L 3/0023 324/418 |
| 2015/0137824 A1* | 5/2015 | Nishihara | G01R 31/3658 324/434 |
| 2015/0191088 A1* | 7/2015 | Gonzales | G07C 5/0808 701/34.2 |
| 2015/0198671 A1* | 7/2015 | Nortman | H02J 7/0016 324/426 |
| 2015/0200552 A1* | 7/2015 | Nortman | H02J 7/0016 320/134 |
| 2015/0202983 A1* | 7/2015 | Le | H01M 10/441 320/109 |
| 2015/0202984 A1* | 7/2015 | Wyatt | B60L 58/20 320/109 |
| 2015/0202985 A1* | 7/2015 | Le | B60L 50/64 307/9.1 |
| 2015/0217651 A1* | 8/2015 | Dougan | H02J 7/00 320/109 |
| 2015/0251542 A1* | 9/2015 | Mensah-Brown | B60L 50/51 307/10.1 |
| 2015/0256059 A1* | 9/2015 | Balakrishnan | H02M 1/32 320/166 |
| 2016/0079779 A1* | 3/2016 | Troxel | H01M 10/4207 320/118 |
| 2016/0089988 A1* | 3/2016 | Bartz | B60L 11/182 320/108 |
| 2017/0028857 A1* | 2/2017 | Gonzales | B60L 11/1809 |
| 2017/0101029 A1* | 4/2017 | Kawano | B60L 11/1842 |
| 2017/0120770 A1* | 5/2017 | Huynh | H02P 29/024 |
| 2017/0162851 A1* | 6/2017 | Wyatt | B60L 58/20 |
| 2017/0166065 A1* | 6/2017 | Hong | B60L 3/04 |
| 2017/0246959 A1* | 8/2017 | Loftus | B60L 11/1809 |
| 2017/0302156 A1* | 10/2017 | Balakrishnan | H02M 1/32 |
| 2018/0017631 A1* | 1/2018 | Kudo | G01R 31/3658 |
| 2018/0043783 A1* | 2/2018 | Tabatowski-Bush | B60L 11/1803 |
| 2018/0043847 A1* | 2/2018 | Burkman | B60R 16/03 |
| 2018/0138486 A1* | 5/2018 | Wyatt | B60L 58/20 |
| 2018/0366712 A1* | 12/2018 | Wyatt | B60L 58/20 |
| 2019/0097438 A1* | 3/2019 | Song | H02J 7/0031 |
| 2019/0207394 A1* | 7/2019 | Troxel | H01M 10/4207 |

FOREIGN PATENT DOCUMENTS

| | | | | |
|---|---|---|---|---|
| JP | 2011182530 A | * | 9/2011 | B60L 3/04 |
| JP | 2015155243 A | * | 8/2015 | |
| KR | 20130078879 A | * | 7/2013 | |

* cited by examiner

HIGH VOLTAGE BUS CONTACTOR FAULT DETECTION

TECHNICAL FIELD

The present disclosure relates to systems and methods for performing fault detection in a multi-bus system.

BACKGROUND

A hybrid or an electric vehicle may be equipped with at least one traction battery configured to provide energy for propulsion. The traction battery may also provide energy for other vehicle electrical systems. For example, the traction battery may transfer energy to high voltage loads, such as compressors and electric heaters. In another example, the traction battery may provide energy to low voltage loads, such as an auxiliary 12V battery.

SUMMARY

A system for a vehicle includes a pair of electrical buses connected to terminals of a traction battery via a shared positive contactor and a pair of negative contactors, and a controller configured to, responsive to a request to close the contactors and a difference between voltage magnitudes of the buses being greater than a predefined threshold, actively discharge one of the buses to reduce the difference.

A method for a vehicle includes, responsive to a request to close a pair of contactors and a difference between voltage magnitudes of the buses being greater than a predefined threshold, actively discharging one of a pair of electrical buses until the magnitudes are within a predefined range of each other, wherein the buses are connected to terminals of a traction battery via a shared positive contactor and a respective negative contactor.

A dual-bus arrangement for a vehicle includes a controller configured to, prior to issuing a command to open negative contactors connecting negative terminals of a pair of buses to a traction battery, actively discharge both buses responsive to a voltage magnitude of one of the buses being greater than a predefined threshold.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Electric and electrified vehicles may define a high voltage multi-bus architecture, such as, for example, an architecture including an auxiliary electric bus linked with a main electric bus. In one example, the linked auxiliary and main buses may both be connected to a positive terminal of a traction battery through a pre-charge contactor and a positive main contactor. Each one of the auxiliary and main buses may be further connected to a negative terminal of the traction battery by a respective negative contactor.

A controller of the traction battery may operate the contactors using a predefined control sequence in response to receiving a predefined signal or command, e.g., signal resulting from a user or a system command to turn the vehicle on, turn the vehicle off, quickly cycle vehicle on/off state, and so on. Fault detection in the multi-bus architecture may include detecting and/or preventing a contactor weld among the contactors connecting the buses to the negative terminal of the traction battery. In some instances, a welded contactor may occur when a contactor being closed connects a bus that has residual voltage resulting from an incomplete bus discharge following a previous disconnect sequence.

Figure 1:
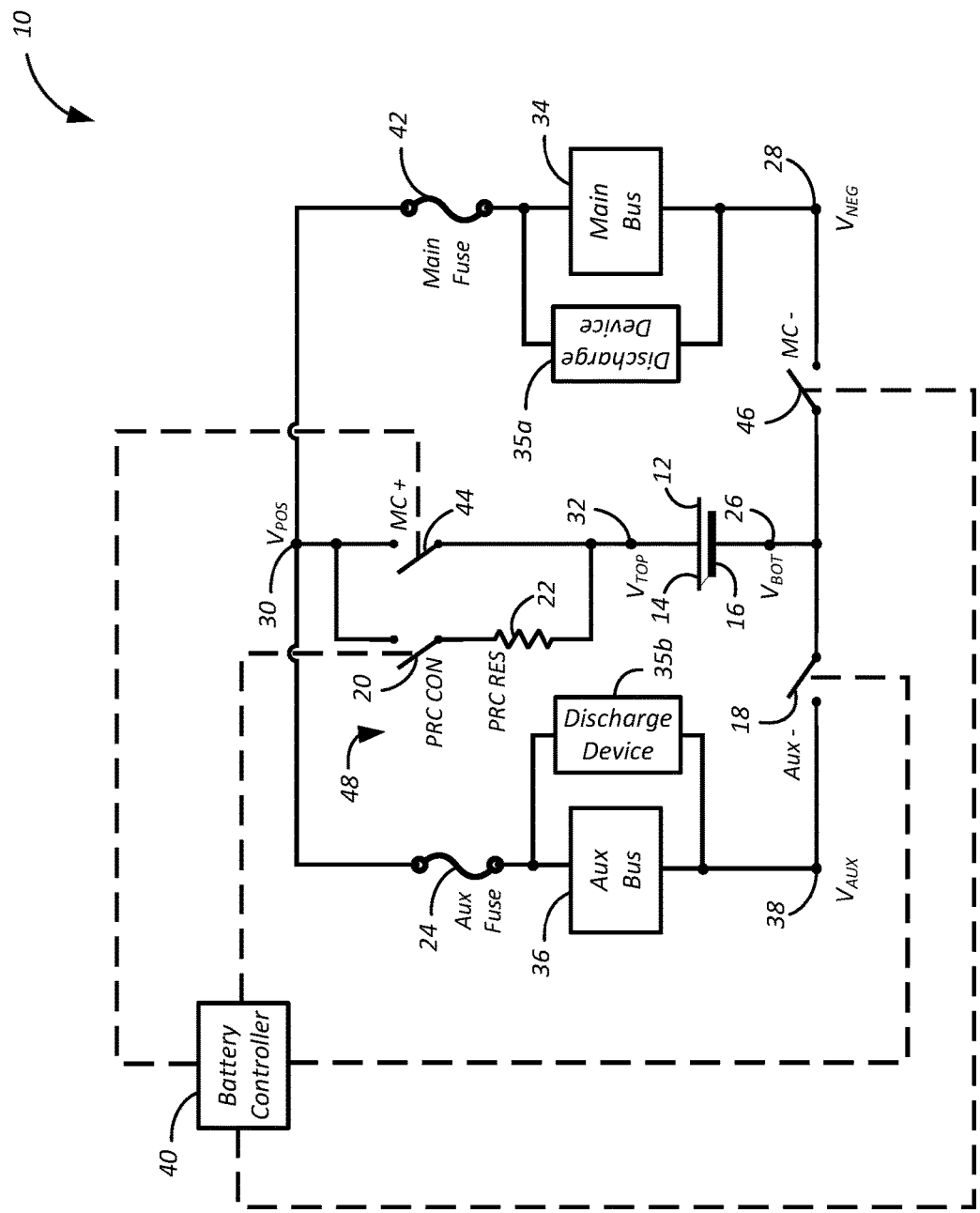
FIG. 1 is a block diagram of a hybrid electric vehicle (HEV) including linked main and auxiliary buses.

Referring now to FIG. 1, an example multi-bus arrangement 10 for a vehicle is shown. The arrangement 10 may define one of a variety of vehicle types, such as crossover utility vehicle (CUV), sport utility vehicle (SUV), truck, recreational vehicle (RV), boat, plane or other mobile machine for transporting people or goods. Additionally or alternatively, the arrangement 10 may define one of a variety of electric and electrified propulsion systems, such as, but not limited to, a plug-in hybrid-electric vehicle (PHEV), battery electric vehicle (BEV), and so on, configured to provide reduced pollutant emissions by operating in electric mode or hybrid mode under certain conditions to reduce overall fuel consumption of the vehicle. The various components discussed in reference to the arrangement 10 may have one or more associated controllers to control and monitor the operation of the components. The controllers may communicate via a serial bus (e.g., Controller Area Network (CAN)), via discrete conductors, and so on.

The arrangement 10 includes a traction battery 12 including positive and negative terminals 14 and 16, respectively, allowing supply and withdrawal of electric energy to and from the traction battery 12. In one example, the traction battery 12 may comprise one or more battery cells (not shown), e.g., electrochemical cells, capacitors, or other types of energy storage device implementations. The battery cells may be arranged in any suitable configuration and configured to receive and store electric energy for use in operation of the traction battery 12. Each cell may provide a same or different nominal threshold of voltage. The battery cells may be arranged into one or more arrays, sections, or modules further connected in series or in parallel. In one example, the traction battery 12 may be configured to receive electric charge using a wired and wireless connection to a charging station (not shown) in turn connected to a power source (not shown).

The traction battery 12 may be configured to supply energy to a vehicle main bus (hereinafter, main bus) 34 in turn supplying power to a main load of the vehicle and a vehicle auxiliary bus (hereinafter, auxiliary bus) 36 in turn supplying power to an auxiliary load of the vehicle. In one example, a battery controller 40 may be configured to energize the positive and negative terminals 14, 16 of the traction battery 12 enabling current flow between the traction battery 12 and the main bus 34 and the auxiliary bus 36. As such, the battery controller 40 may include a processor (not shown) configured to process instructions stored in a memory (not shown) of the controller 40 to perform functions described herein. In some examples, the battery controller 40 may be configured to monitor and manage voltage magnitude, current magnitude, temperature and state of charge of one or more of the battery cells of the traction battery 12. In other examples, the battery controller 40 may enable or disable energy flow to and from the traction battery 12 in response to temperature or state of charge in a given battery cell reaching a predefined threshold temperature.

The battery controller 40 may be in communication with one or more other vehicle controllers (not shown), such as, but not limited to, an engine controller and transmission controller, and may enable or disable energy flow to and from the traction battery 12 in response to a predetermined signal from the one or more other vehicle controllers. The battery controller 40 and other vehicle controllers may be configured to communicating using a vehicle serial bus or another wired or wireless communication method.

The main bus 34 may supply power to a main load, including, but not limited to, one or more electric machines or other bi-directional energy conversion devices configured to, in place of or in cooperation with an internal combustion engine, supply vehicle propulsion and deceleration energy. As such, the main load may be mechanically connected to a vehicle transmission or a gear set in turn connected to wheels via a drive shaft. In those instances where the main load operates using alternating current (AC) power, the arrangement 10 may include an inverter (not shown) configured to convert a high voltage direct current (DC) output of the traction battery 12 to AC input compatible with the main load and/or convert AC energy output by the main load to DC input compatible with the traction battery 12.

In addition to providing energy to the main bus 34, the traction battery 12 may provide energy for the auxiliary bus 36 in turn supplying power to one or more vehicle electrical system components, such as, but not limited to, high voltage loads (e.g., compressors and electric heaters) and/or low voltage loads (e.g., auxiliary 12V battery). The arrangement 10 may, in some examples, include a DC/DC converter (not shown) that converts the high voltage DC output of the traction battery 12 to a low voltage DC supply that is compatible with the low voltage loads.

The flow of electrical energy between the traction battery 12 and the main and auxiliary buses 34, 36 may be selectively controlled using one or more switches or other electrical devices. The battery controller 40 may, for instance, selectively issue one or more commands to open or close the switches to enable electric current flow between the traction battery 12 and the main and auxiliary buses 34, 36. In one example, the main bus 34 may be electrically connected to the positive terminal 14 of the traction battery 12 via a positive main contactor 44 and electrically connected to the negative terminal 16 of the traction battery 12 via a negative main contactor 46 electrically connected between the negative terminal 16 of the traction battery 12 and the main bus 34. In another example, the auxiliary load may be connected to the positive terminal 14 of the traction battery 12 via the positive main contactor 44 and connected to the negative terminal 16 of the traction battery 12 via an auxiliary contactor 18.

The arrangement 10 may further comprise a pre-charge circuit 48 configured to control an energizing process of the positive terminal 14. In some examples, the pre-charge circuit 48 may include a pre-charge resistor 22 connected in series with a pre-charge contactor 20 operated by the battery controller 40. The pre-charge circuit 48 may be electrically connected in parallel with the positive main contactor 44, such that, when the pre-charge contactor 20 is closed, the positive main contactor 44 may be opened and one or both of the negative main contactor 46 and the auxiliary contactor 18 may be closed, allowing the electric energy to flow through the pre-charge circuit 48 and control the energizing process of the positive terminal 14.

In one example, the battery controller 40 may command to close the positive main contactor 44 and open the pre-charge contactor 20 in response to detecting that voltage across the traction battery 12, e.g., at the positive and negative terminals 14, 16, reached a predefined magnitude. The transfer of electric energy between the traction battery 12 and the main bus 34 may then continue via the positive and negative main contactors 44, 46 and between the traction battery 12 and the auxiliary bus 36—via the positive main contactor 44 and the auxiliary contactor 18.

A main fuse 42, connected between the positive main contactor 44 and the main bus 34, and an auxiliary fuse 24, connected between the positive main contactor 44 and the auxiliary bus 36, may each be configured to open in response to electric current flow to the respective bus exceeding a predefined current threshold.

In some examples, each of the positive and negative main contactors 44, 46, the auxiliary contactor 18, and the pre-charge contactor 20 may define an electro-mechanical device comprising an inductive coil and a relay, where energizing the inductive coil causes the relay to close and de-energizing the inductive coil causes the relay to open. As such, the battery controller 40 may command a given contactor to close by enabling current flow to the inductive coil of the contactor and command a given contactor to open by disabling current flow to the inductive coil of the contactor. In other examples, the positive and negative main contactors 44, 46, the auxiliary contactor 18, and the pre-charge contactor 20 taken together, separately, or in combination with other switches or electrical devices may define a bussed electrical center (BEC) of the traction battery 12.

The battery controller 40 may be configured to determine voltage across one or more of the positive and negative main contactors 44, 46, the auxiliary contactor 18, and the pre-charge contactor 20. In one example, the battery controller 40 may determine voltage across the positive main contactor 44 by measuring voltage (or by receiving a signal indicative of voltage) between reference points $V_{POS}$ 30 and $V_{TOP}$ 32. In another example, the battery controller 40 may determine voltage across the negative main contactor 46 by measuring voltage (or by receiving a signal indicative of voltage) between reference points $V_{NEG}$ 28 and $V_{BOT}$ 26. Additionally or alternatively, the battery controller 40 may determine voltage across the auxiliary contactor 18 by measuring voltage (or by receiving a signal indicative of voltage) between reference points $V_{AUX}$ 38 and $V_{BOT}$ 26.

In some examples, the battery controller 40 may be configured to determine voltage $V_{BS\_MN}$ across the main bus 34 by measuring voltage (or receiving a signal indicative of voltage) between reference points $V_{POS}$ 30 and $V_{BOT}$ 26 in response to closing of the negative main contactor 46. In other examples, the battery controller 40 may be configured to determine voltage $V_{BS\_AX}$ across the auxiliary bus 36 by measuring voltage (or receiving a signal indicative of voltage) between reference points $V_{POS}$ 30 and $V_{BOT}$ 26 in response to closing of the auxiliary contactor 18.

The battery controller 40 may be further configured to compare respective voltage values across the main bus 34 and auxiliary bus 36 and, responsive to a difference between the voltage values exceeding a predefined threshold, control magnitudes of voltages across the main bus 34 and the auxiliary bus 36. The battery controller 40 may, for example, operate one or more discharge devices 35, active or passive electrical or electronic components, connected across either or both of the main bus 34 and the auxiliary bus 36 and configured to lower voltage across, i.e., actively discharge, the respective one of the buses. In another example, the battery controller 40 may actively discharge a given bus by providing current to or otherwise activating a resistive component of the discharge device 35 connected across the bus, however, other methods of actively discharging an electrical bus are also contemplated. The battery controller 40 may actively discharge one of the main and auxiliary buses 34, 36 such that difference between voltage $V_{BS\_MN}$ across the main bus 34 and voltage $V_{BS\_AX}$ across the auxiliary bus 36 is less than a predefined threshold.

Figure 2A:
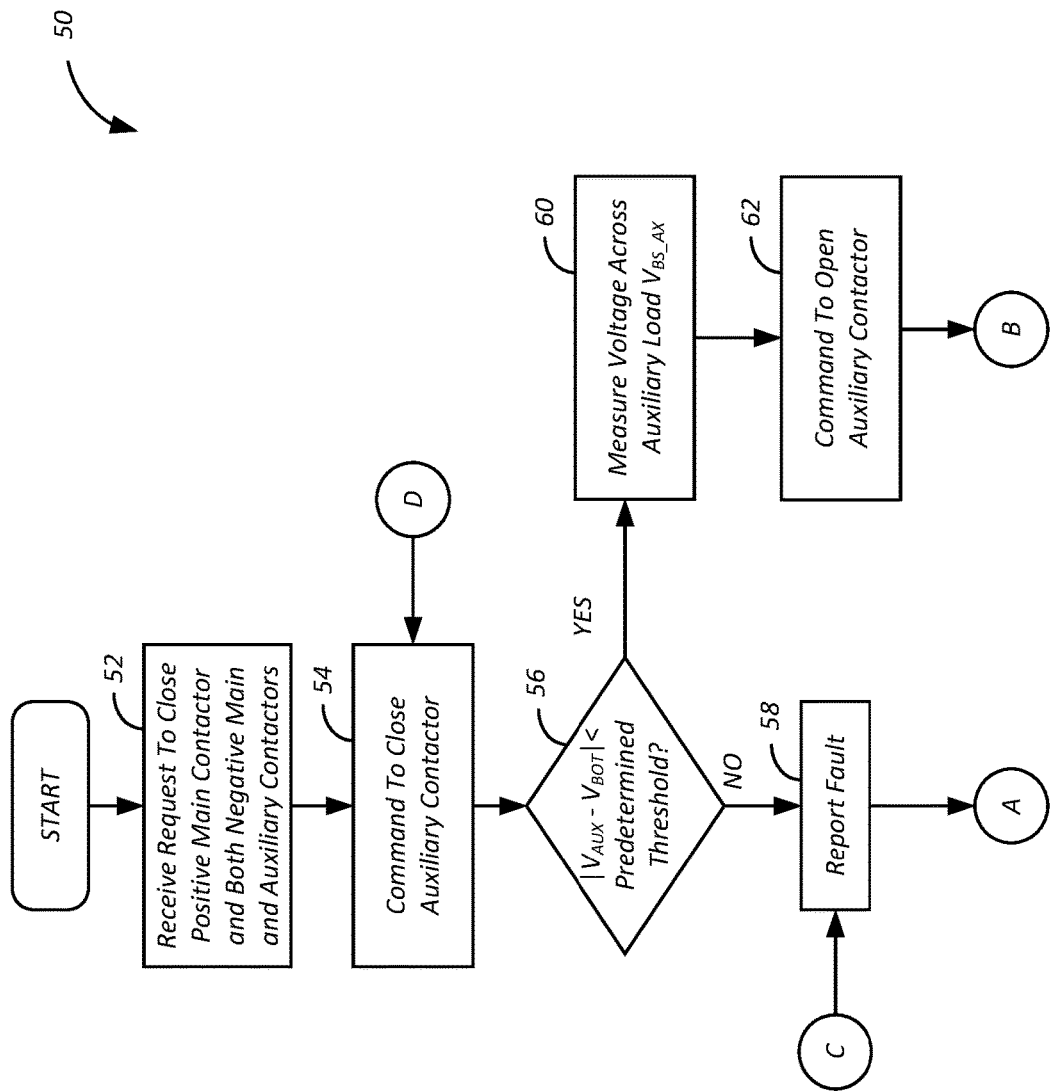
FIGS. 2A-2B and 3 are flowcharts illustrating an algorithm for performing diagnostics in a multi-bus system.
Figure 2B:
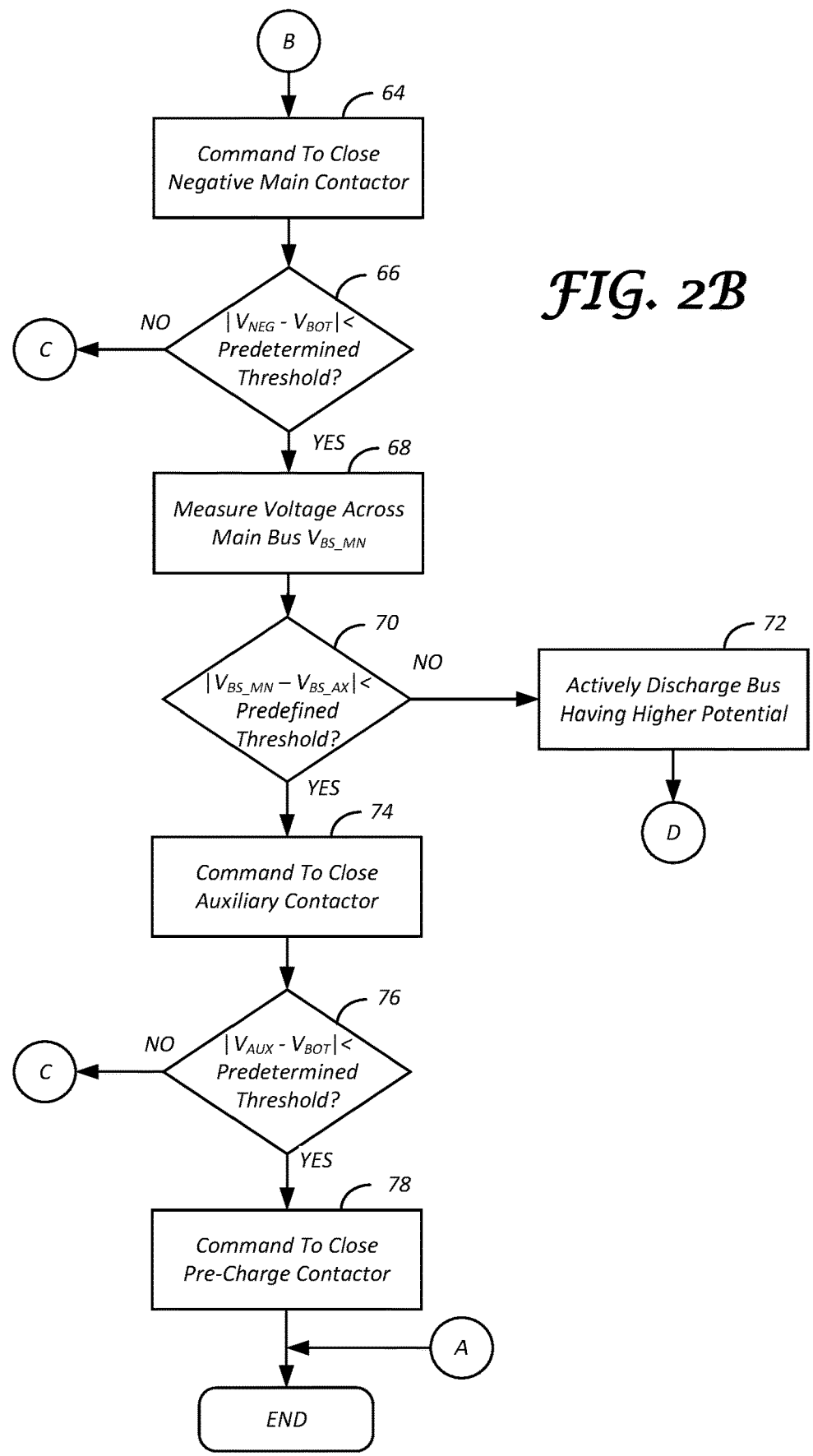

In reference to FIGS. 2A and 2B, a diagnostic process 50 for performing fault detection in a multi-bus system is shown. The process 50 may begin at block 52 where the battery controller 40 receives a signal indicative of a request to close the positive main contactor 44 and to close both the negative main and the auxiliary contactors 46, 18. In one example, the battery controller 40 may receive from the one or more vehicle controllers a request to close the positive main contactor 44 and both of the negative main and the auxiliary contactors 46, 18 in response to detecting a key-on signal, such as a request by the user to start the vehicle.

Responsive to the request, the battery controller 40 at block 54 issues a command to close the auxiliary contactor 18, such as by enabling current flow to the inductive coil of the auxiliary contactor 18. The battery controller 40 determines at block 56 whether the auxiliary contactor 18 is closed, e.g., by determining whether voltage across the auxiliary contactor 18 is less than a predefined threshold a predefined period of time after issuing a command to close the auxiliary contactor 18. In one example, the battery controller 40 determines voltage across the auxiliary contactor 18 by measuring voltage (or receiving a signal indicative of voltage) between reference points $V_{AUX}$ 38 and $V_{BOT}$ 26.

The battery controller 40 may issue a diagnostic notification at block 58 responsive to voltage across the auxiliary contactor 18 exceeding a predefined threshold a predefined period of time after issuance of the command to close the auxiliary contactor 18. The battery controller 40 and/or the one or more other vehicle controllers may set a diagnostic trouble code (DTC) indicative of an auxiliary contactor 18 fault. Additionally or alternatively, the battery controller 40 may display an indication to a user of the vehicle that a contactor fault has been detected. Furthermore, the battery controller 40 may preclude initiation of the pre-charge responsive to voltage across the auxiliary contactor 18 exceeding a predefined threshold a predefined period of time after issuance of the command to close the auxiliary contactor 18.

Responsive to determining at block 56 that the auxiliary contactor 18 is closed, e.g., voltage across the auxiliary contactor 18 is less than a predefined threshold, the battery controller 40 at block 60 measures voltage $V_{BS\_AX}$ across the auxiliary bus 36, such as by measuring voltage between reference points $V_{POS}$ 30 and $V_{BOT}$ 26. The battery controller 40 commands to open the auxiliary contactor 18 at block 62 in response to detecting voltage $V_{BS\_AX}$ across the auxiliary bus 36.

At block 64 the battery controller 40 commands to close the negative main contactor 46, such as by enabling current flow to the inductive coil of the negative main contactor 46. The battery controller 40 determines at block 66 whether the negative main contactor 46 is closed, e.g., by determining whether voltage across the negative main contactor 46 is less than a predefined threshold a predefined period of time after issuing a command to close the negative main contactor 46. In one example, the battery controller 40 determines voltage across the negative main contactor 46 by measuring voltage (or receiving a signal indicative of voltage) between reference points $V_{NEG}$ 28 and $V_{BOT}$ 26.

The battery controller 40 may issue a diagnostic notification at block 58 responsive to voltage across the negative main contactor 46 exceeding a predefined threshold a predefined period of time after issuance of the command to close the negative main contactor 46. The battery controller 40 and/or the one or more other vehicle controllers may set a DTC indicative of the negative main contactor 46 fault. Additionally or alternatively, the battery controller 40 may display an indication to a user of the vehicle that a contactor fault has been detected. Furthermore, the battery controller 40 may preclude initiation of the pre-charge responsive to voltage across the negative main contactor 46 exceeding a predefined threshold a predefined period of time after issuance of the command to close the negative main contactor 46.

Responsive to determining at block 66 that the negative main contactor 46 is closed, e.g., voltage across the negative main contactor 46 is less than a predefined threshold, the battery controller 40 at block 68 measures voltage $V_{BS\_MN}$ across the main bus 34, such as by measuring voltage between reference points $V_{POS}$ 30 and $V_{BOT}$ 26. In one example, the battery controller 40 may command to open the negative main contactor 46 in response to detecting voltage $V_{BS\_MN}$ across the main bus 34.

At block 70 the battery controller 40 determines whether difference between voltage $V_{BS\_MN}$ across the main bus 34 and voltage $V_{BS\_AX}$ across the auxiliary bus 36 is less than a predefined threshold. The battery controller 40 commands at block 72 to actively discharge one of the auxiliary bus 36 and the main bus 34 having a higher voltage magnitude responsive to determining at block 70 that difference between difference between voltage $V_{BS\_MN}$ across the main bus 34 and voltage $V_{BS\_AX}$ across the auxiliary bus 36 exceeds a predefined threshold. In one example, the battery controller 40 actively discharges a given bus by providing current to or otherwise activating a resistive component of the discharge device 35 connected across the respective bus, however, other methods of actively discharging an electrical bus are also contemplated. In one example, the battery controller 40 actively discharges one of the main and auxiliary buses 34, 36 such that difference between voltage $V_{BS\_MN}$ across the main bus 34 and voltage $V_{BS\_AX}$ across the auxiliary bus 36 is less than a predefined threshold.

Responsive to performing active discharge the battery controller 40 may confirm that difference between voltage $V_{BS\_MN}$ across the main bus 34 and voltage $V_{BS\_AX}$ across the auxiliary bus 36 is less than a predefined threshold. The battery controller 40 may, in one example, return to block 70 where it may compare voltage $V_{BS\_MN}$ across the main bus 34 and voltage $V_{BS\_AX}$ across the auxiliary bus 36. Additionally or alternatively, the battery controller 40 may return to block 54 and perform one or more operations in blocks 54-70 to confirm that the magnitude of a difference is less than a predefined threshold.

Responsive to determining at block 70 that difference between voltage $V_{BS\_MN}$ across the main bus 34 and voltage $V_{BS\_AX}$ across the auxiliary bus 36 is less than a predefined threshold, the battery controller 40 at block 74 commands to close the auxiliary contactor 18. The battery controller 40 determines at block 76 whether the auxiliary contactor 18 is closed, e.g., by determining whether voltage across the auxiliary contactor 18 is less than a predefined threshold a predefined period of time after issuing a command to close the auxiliary contactor 18. In one example, the battery controller 40 determines voltage across the auxiliary contactor 18 by measuring voltage (or receiving a signal indicative of voltage) between reference points $V_{AUX}$ 38 and $V_{BOT}$ 26.

The battery controller 40 may issue a diagnostic notification at block 58 responsive to voltage across the auxiliary contactor 18 exceeding a predefined threshold a predefined period of time after issuance of the command to close the auxiliary contactor 18. The battery controller 40 may set a DTC indicative of the auxiliary contactor 18 fault, display an indication to a user of the vehicle that a contactor fault has been detected, and preclude initiation of the pre-charge responsive to voltage across the auxiliary contactor 18 exceeding a predefined threshold a predefined period of time after issuance of the command to close the auxiliary contactor 18.

At block 78 the battery controller 40 may initiate pre-charge in response to voltage across the auxiliary contactor 18 being less than a predefined threshold a predefined period of time after issuance of the command to close the auxiliary contactor 18. In one example, the battery controller 40 may command to close the pre-charge contactor 20 of the pre-charge circuit 48. The process 50 may then end. In some examples, the process 50 may be repeated responsive to receiving a signal indicative of a request to close the positive main contactor 44 and both of the negative main and auxiliary contactors 46, 18, or in response to another signal or request.

Figure 3:
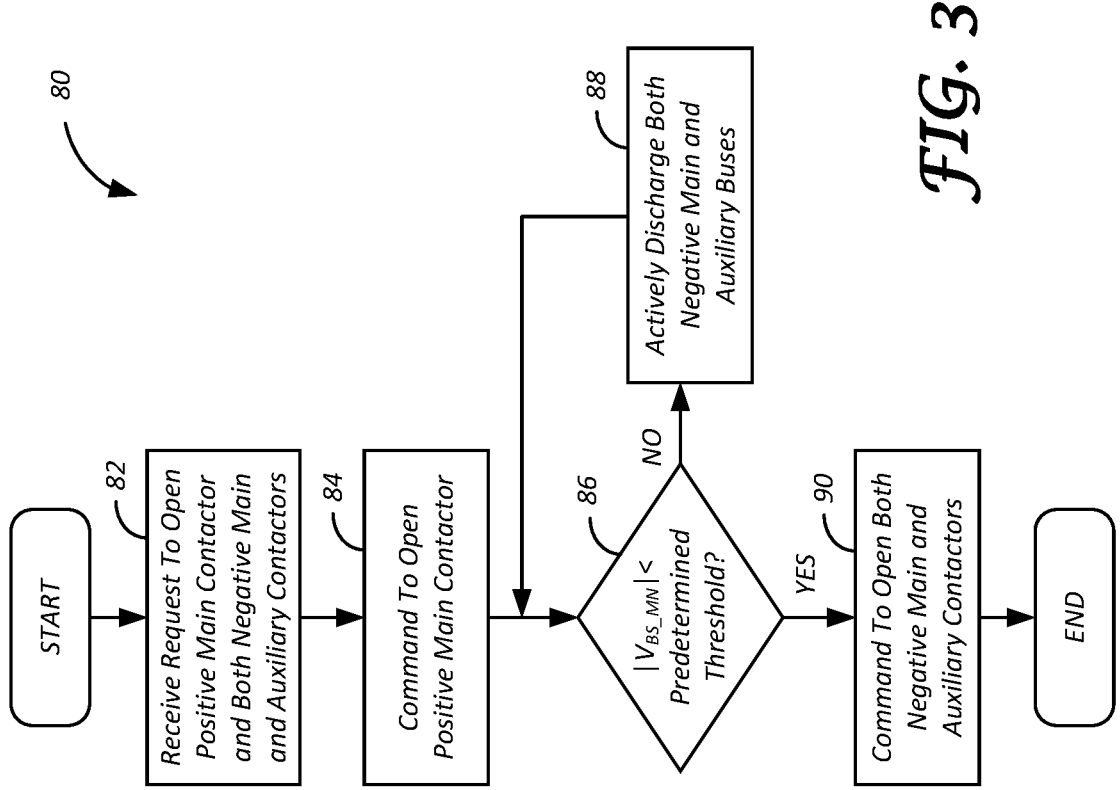

In reference to FIG. 3, a diagnostic process 80 for performing fault detection in a multi-bus system is shown. The process 80 may begin at block 82 where the battery controller 40 receives a signal indicative of a request to open the positive main contactor 44 and to open both the negative main and the auxiliary contactors 46, 18. In one example, the battery controller 40 may receive from the one or more vehicle controllers a request to open the positive main contactor 44 and both of the negative main and the auxiliary contactors 46, 18 in response to detecting a key-off signal, such as a request by the user to turn off the vehicle.

Responsive to the request, the battery controller 40 at block 84 issues a command to open the positive main contactor 46, such as by disabling current flow to the inductive coil of the positive main contactor 46. The battery controller 40 determines at block 86 whether voltage across one of the main and the auxiliary buses 34, 36 is less than a predefined voltage threshold. In one example, the battery controller 40 determines voltage $V_{BS\_MN}$ across the main bus 34 by measuring voltage between reference points $V_{POS}$ 30 and $V_{BOT}$ 26. In another example, the battery controller 40 determines voltage $V_{BS\_AX}$ across the auxiliary bus 36 by measuring voltage between reference points $V_{POS}$ 30 and $V_{BOT}$ 26.

Responsive to determining at block 86 that voltage across one of the main and the auxiliary buses 34, 36 exceeds a predefined voltage threshold, the battery controller 40 at block 88 actively discharges both of the auxiliary bus 36 and the main bus 34. In one example, the battery controller 40 actively discharges a given bus by providing current to or otherwise activating a resistive component of the discharge device 35 connected across the respective bus, however, other methods of actively discharging an electrical bus are also contemplated. In one example, the battery controller 40 actively discharges one of the main and auxiliary buses 34, 36 such that voltage $V_{BS\_MN}$ across the main bus 34 and voltage $V_{BS\_AX}$ across the auxiliary bus 36 is less than a predefined threshold. Following performance of active discharge at block 88, the battery controller 40 may proceed to block 86 where it confirms that voltage across one of the main and auxiliary buses 34, 36 is less than a predefined threshold.

Responsive to determining at block 86 that voltage across one of the main and the auxiliary buses 34, 36 is below a predefined voltage threshold, the battery controller 40 at block 90 commands to open both the negative main contactor 46 and the auxiliary contactor 18. The process 80 may then end. In some examples, the process 80 may be repeated responsive to receiving a signal indicative of a request to open the positive main contactor 44 and both of the negative main and auxiliary contactors 46, 18, or in response to another signal or request.

The processes, methods, or algorithms disclosed herein may be deliverable to or implemented by a processing device, controller, or computer, which may include any existing programmable electronic control unit or dedicated electronic control unit. Similarly, the processes, methods, or algorithms may be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms may also be implemented in a software executable object. Alternatively, the processes, methods, or algorithms may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A system for a vehicle comprising:
    a pair of electrical buses connected to a positive terminal of a traction battery via a shared positive contactor and connected to a negative terminal of the traction battery via a respective one of a pair of negative contactors, such that each bus is connected in parallel with the traction battery and transfers power between the traction battery and a corresponding electrical load when the positive and respective one of the negative contactors are closed; and
    a controller configured to, responsive to a request to close the contactors and a difference between voltage magnitudes of the buses being greater than a predefined threshold, actively discharge one of the buses to reduce the difference.

2. The system of claim 1, wherein the controller is further configured to actively discharge the one of the buses such that the voltage magnitudes are within a predefined range of each other.

3. The system of claim 1, wherein the controller is further configured to measure each of the voltage magnitudes via a potential difference between a positive terminal of the shared positive contactor and a respective negative terminal of each of the buses.

4. The system of claim 1, wherein the controller is further configured to initiate pre-charge following the active discharge.

5. The system of claim 1, wherein the controller is further configured to actively discharge one of the buses by selectively applying a resistance across the bus.

6. The system of claim 1, wherein the controller is further configured to measure the difference responsive to confirmation that voltages across the negative contactors are each less than a second predefined threshold following a command resulting from the request to sequentially close the negative contactors.

7. The system of claim 6, wherein the confirmation indicates that each of the voltages has fallen below the second predefined threshold within a predetermined period of time that began with issuance of the command.

8. A method for a vehicle comprising:
    responsive to a request to close a pair of contactors and a difference between voltage magnitudes of a pair of electrical buses being greater than a predefined threshold, actively discharging one of the buses until the magnitudes are within a predefined range of each other, wherein the buses are connected to a positive terminal of a traction battery via a shared positive contactor and connected to a negative terminal of the traction battery via a respective one of a pair of negative contactors and each bus is connected in parallel with the traction battery and transfers power from the traction battery to a corresponding electrical load when the positive and respective one of the negative contactors are closed.

9. The method of claim 8 further comprising measuring the voltage magnitudes via a potential difference between a positive terminal of the shared positive contactor and a respective negative terminal of each of the buses.

10. The method of claim 8 further comprising initiating a pre-charge following the active discharge.

11. The method of claim 8, wherein the actively discharging includes selectively applying a resistance across the bus.

12. The method of claim 8 further comprising measuring the difference responsive to a confirmation that voltages across the negative contactors are each less than a second predefined threshold following a command resulting from the request to sequentially close the negative contactors.

13. The method of claim 12, wherein the confirmation indicates that each of the voltages has fallen below the second predefined threshold within a predetermined period of time that began with issuance of the command.

14. A dual-bus arrangement for a vehicle comprising:
    a controller configured to, prior to issuing a command to open negative contactors connecting respective negative terminals of a pair of electrical buses to a negative terminal of a traction battery and in response to opening of a shared positive contactor connecting respective positive terminals of the buses to a positive terminal of the traction battery, such that each bus is connected in parallel with the traction battery and transfers power between the traction battery and a corresponding electrical load when the contactors are closed, actively discharge both buses responsive to a voltage magnitude of one of the buses being greater than a predefined threshold.

15. The arrangement of claim 14, wherein the controller is further configured to measure the voltage magnitude via a potential difference between a positive terminal of the positive contactor and a negative terminal of the bus.

16. The arrangement of claim 14, wherein one of the buses defines a main bus configured to transfer energy between the traction battery and a load assisting propulsion of the vehicle.

* * * * *